US010394353B2

(12) United States Patent
Lee

(10) Patent No.: US 10,394,353 B2
(45) Date of Patent: Aug. 27, 2019

(54) IN-CELL TOUCH DISPLAY STRUCTURE

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 285 days.

(21) Appl. No.: 14/857,502

(22) Filed: Sep. 17, 2015

(65) Prior Publication Data

US 2016/0085364 A1 Mar. 24, 2016

(30) Foreign Application Priority Data

Sep. 19, 2014 (TW) .............................. 103216657 U

(51) Int. Cl.
*G06F 3/045* (2006.01)
*G06F 3/041* (2006.01)

(52) U.S. Cl.
CPC ............ *G06F 3/0412* (2013.01); *G06F 3/045* (2013.01); *G06F 3/0416* (2013.01); *G06F 2203/04103* (2013.01); *G06F 2203/04111* (2013.01)

(58) Field of Classification Search
CPC ......... G06F 3/0412; G06F 2203/04103; G06F 3/045; G06F 3/0416; G06F 2203/04111
See application file for complete search history.

(56) References Cited

U.S. PATENT DOCUMENTS

| 2012/0056835 | A1* | 3/2012 | Choo | G06F 3/0412 345/173 |
|---|---|---|---|---|
| 2013/0002997 | A1* | 1/2013 | Lu | G02F 1/13338 349/96 |
| 2013/0069894 | A1* | 3/2013 | Chen | G06F 3/0412 345/173 |
| 2013/0335365 | A1* | 12/2013 | Kim | G06F 3/044 345/174 |
| 2014/0104510 | A1* | 4/2014 | Wang | G06F 3/0412 349/12 |
| 2014/0125879 | A1* | 5/2014 | Chiu | G02F 1/13338 349/12 |
| 2014/0132560 | A1* | 5/2014 | Huang | G06F 3/044 345/174 |
| 2014/0204055 | A1* | 7/2014 | Lu | G06F 3/0412 345/174 |

(Continued)

*Primary Examiner* — Benjamin C Lee
*Assistant Examiner* — Gerald L Oliver
(74) *Attorney, Agent, or Firm* — Muncy, Geissler, Olds & Lowe, P.C.

(57) ABSTRACT

An in-cell display touch structure includes an upper substrate, a lower substrate, a display material layer, and a thin film transistor and sensing electrode layer. The thin film transistor and sensing electrode layer has plural conductor lines arranged along a first direction and plural dashed conductor lines arranged along a second direction. Each dashed conductor line is formed by continuing plural conductor segments, and two continued conductor segments are separated from each other. Each conductor segment is arranged in the first direction and close to a gate line in parallel, each conductor line being arranged in the second direction and close to a source line in parallel. A portion of the conductor segments is used to form plural sensing areas and a portion of the conductor lines is used to form plural sensing signal connection lines.

13 Claims, 8 Drawing Sheets

(56) References Cited

U.S. PATENT DOCUMENTS

2015/0022484 A1\* 1/2015 Chiu ...................... G06F 3/044
 345/174
2016/0048241 A1\* 2/2016 Zhao .................... G06F 3/0412
 345/174

\* cited by examiner

IN-CELL TOUCH DISPLAY STRUCTURE

BACKGROUND OF THE INVENTION

1. Field of the Invention

The present invention relates to a display screen structure with a touch panel and, more particularly, to an in-cell touch display structure.

2. Description of Related Art

Modern consumer electronic apparatuses are typically equipped with touch panels for use as their input devices. According to different sensing manners, the touch panels can be classified into resistive type, capacitive type, acoustic type, and optical type.

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase weight, thickness, reflectance and haze, and may further reduce light transmittance, so that the quality of screen display is greatly reduced.

On-cell and in-cell touch technologies were invented to overcome the drawbacks of traditional touch technology described above. The on-cell technology is to dispose a sensor on the back side of a color filter substrate to form a completed color filter substrate. One of the on-cell touch technologies is provided to dispose a touch sensor on a thin film and then bond the thin film onto the upper one of the two substrates.

The in-cell technology is to dispose the sensor within the LCD cell structure. Currently, there are three primary in-cell touch technologies, that are resistive, capacitive and optical touches, wherein the resistive touch technology employs two conductive substrates and the voltage variation of a common layer between the two substrates for determining a touch position on the touch display panel.

The in-cell touch technology is provided to integrate the touch sensor within the display unit so that the display unit itself has touch capabilities. Therefore, the touch display panel does not need to be bonded with an additional touch panel so as to simplify the assembly procedure. Such skill is generally developed by TFT LCD manufactures.

There is older touch control technology known as out-cell, which is typically applied to the resistive and capacitive touch panels. The out-cell touch technology is provided to add a touch module onto a display module. The touch module and the display module can be manufactured by the two separated parties.

However, for all the in-cell, on-cell and out-cell touch technologies, they all need an ITO sensing layer to be configured on an upper or lower glass substrate, which not only increases the manufacturing cost but also complicates the manufacturing process, and which may also lower the aperture ratio and thus increase the strength of backlight, resulting in huge power consumption which is disadvantageous to make the mobile device power-saving.

Therefore, it is desirable to provide an improved touch display structure to mitigate and/or obviate the aforementioned problems.

SUMMARY OF THE INVENTION

The object of the present invention is to provide an in-cell touch display structure, which can relatively save the material and processing costs by not implementing a sensing electrode layer made of transparent conductive material (ITO) on the upper or lower glass substrate of the display panel, so as to lower the cost and simplify the manufacturing steps.

In one aspect of the present invention, there is provided an in-cell touch display structure, which comprises: an upper substrate; a lower substrate parallel to the upper substrate; a display material layer configured between the upper substrate and the lower substrate; and a thin film transistor and sensing electrode layer disposed on a surface of the lower substrate facing the display material layer and having K gate lines arranged in a first direction and L source lines arranged in a second direction so as to form a plurality of pixel blocks, each pixel block having a pixel transistor and a capacitor corresponding thereto for being driven based on a display pixel signal and a display driving signal thereby performing a display operation, where K and L are each a positive integer, the thin film transistor and sensing electrode layer further having N conductor lines arranged along the first direction and M dashed conductor lines arranged along the second direction, each dashed conductor line being formed by continuing a plurality of conductor segments, two continued conductor segments of each dashed conductor line being separated from each other, where M and N are each a positive integer, each conductor segment being arranged in the first direction and close to a gate line in parallel, each conductor line being arranged in the second direction and close to a source line in parallel, wherein the thin film transistor and sensing electrode layer using a portion of the conductor segments to form a plurality of sensing areas and using a portion of the N conductor lines to form a plurality of sensing signal connection lines respectively corresponding to the plurality of sensing areas so as to detect whether there is an external object approached according to a touch driving signal.

In another aspect of the present invention, there is provided an in-cell touch display structure, which comprises: an upper substrate; a lower substrate parallel to the upper substrate; a display material layer configured between the upper substrate and the lower substrate; and a thin film transistor and sensing electrode layer disposed on a surface of the lower substrate facing the display material layer and having K gate lines arranged in a first direction and L source lines arranged in a second direction so as to form a plurality of pixel blocks, each pixel block having a pixel transistor and a capacitor corresponding thereto for being driven based on a display pixel signal and a display driving signal thereby performing a display operation, where K and L are each a positive integer, the thin film transistor and sensing electrode layer further having M conductor lines arranged along the second direction and N dashed conductor lines arranged along the first direction, each dashed conductor line being formed by continuing a plurality of conductor segments, two continued conductor segments of each dashed conductor line being separated from each other, where M and N are each a positive integer, each conductor line being arranged in the first direction and close to a gate line in parallel, and each conductor segment being arranged in the second direction close to a source line in parallel, wherein the thin film transistor and sensing electrode layer using a portion of the conductor segments to form a plurality of sensing areas and using a portion of the M conductor lines to form a plurality of sensing signal connection lines respectively corresponding to the plurality of sensing areas so as to detect whether there is an external object approached according to a touch driving signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
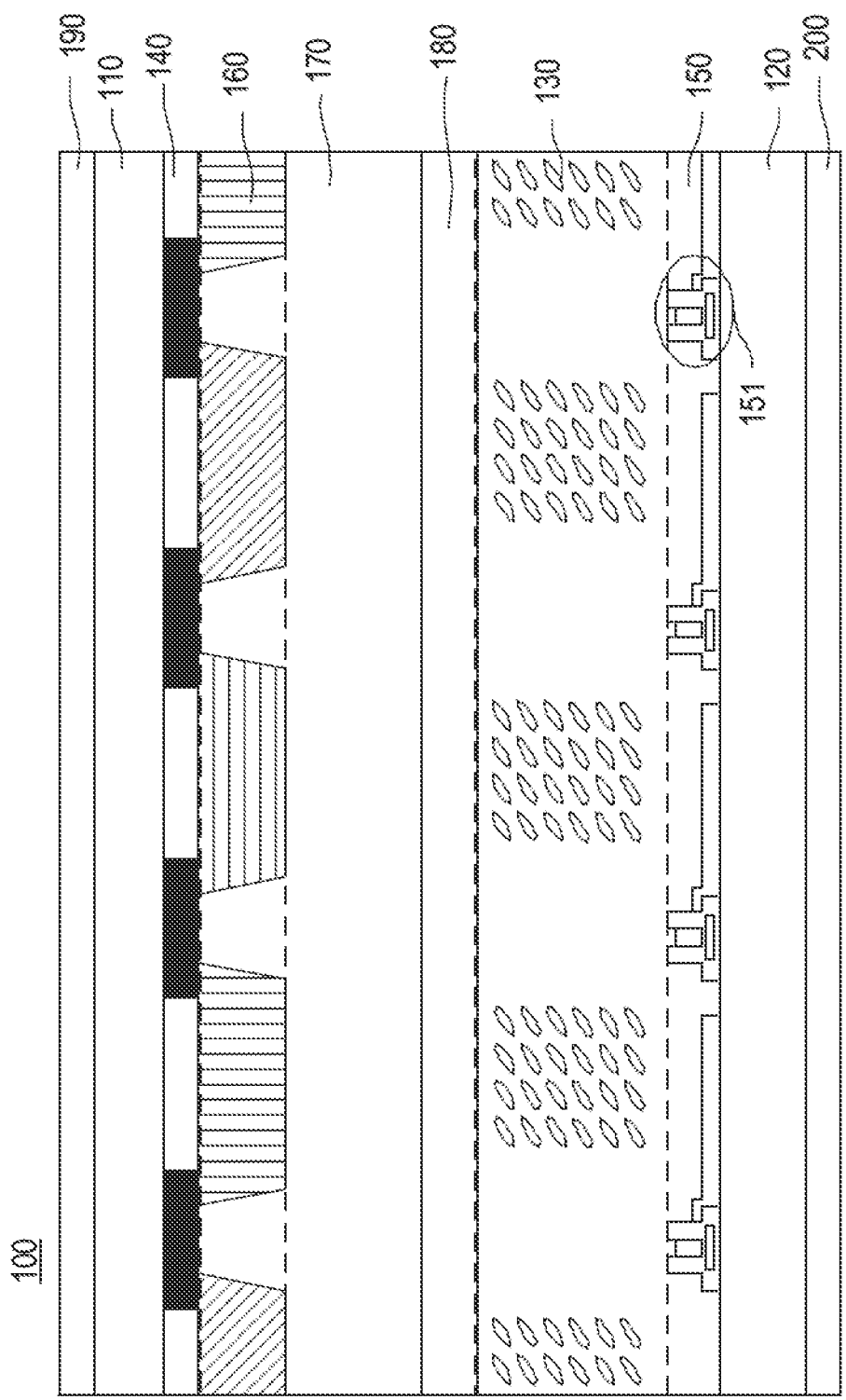
FIG. 1 schematically illustrates a stacked diagram of an in-cell touch display structure according to an embodiment of the invention.

FIG. 1 schematically illustrates a stacked diagram of an in-cell touch display structure according to an embodiment of the invention. As shown in FIG. 1, the in-cell touch display structure 100 includes an upper substrate 110, a lower substrate 120, a display material layer 130, a black matrix layer 140, a thin film transistor and sensing electrode layer 150, a color filter layer 160, an over coat layer 170, a common electrode (Vcom) layer 180, an upper polarizer layer 190, and a lower polarizer layer 200.

The upper substrate 110 and the lower substrate 120 are preferably glass substrates. The upper substrate 110 and the lower substrate 120 are arranged in parallel, and the display material layer 130 is disposed in between the two substrates 110, 120. In this embodiment, the display material layer 130 is preferably a liquid crystal layer.

The black matrix layer 140 is disposed on a surface of the upper substrate 110 facing the display material layer 130. The black matrix layer 140 is composed of a plurality of opaque lines.

Figure 2:
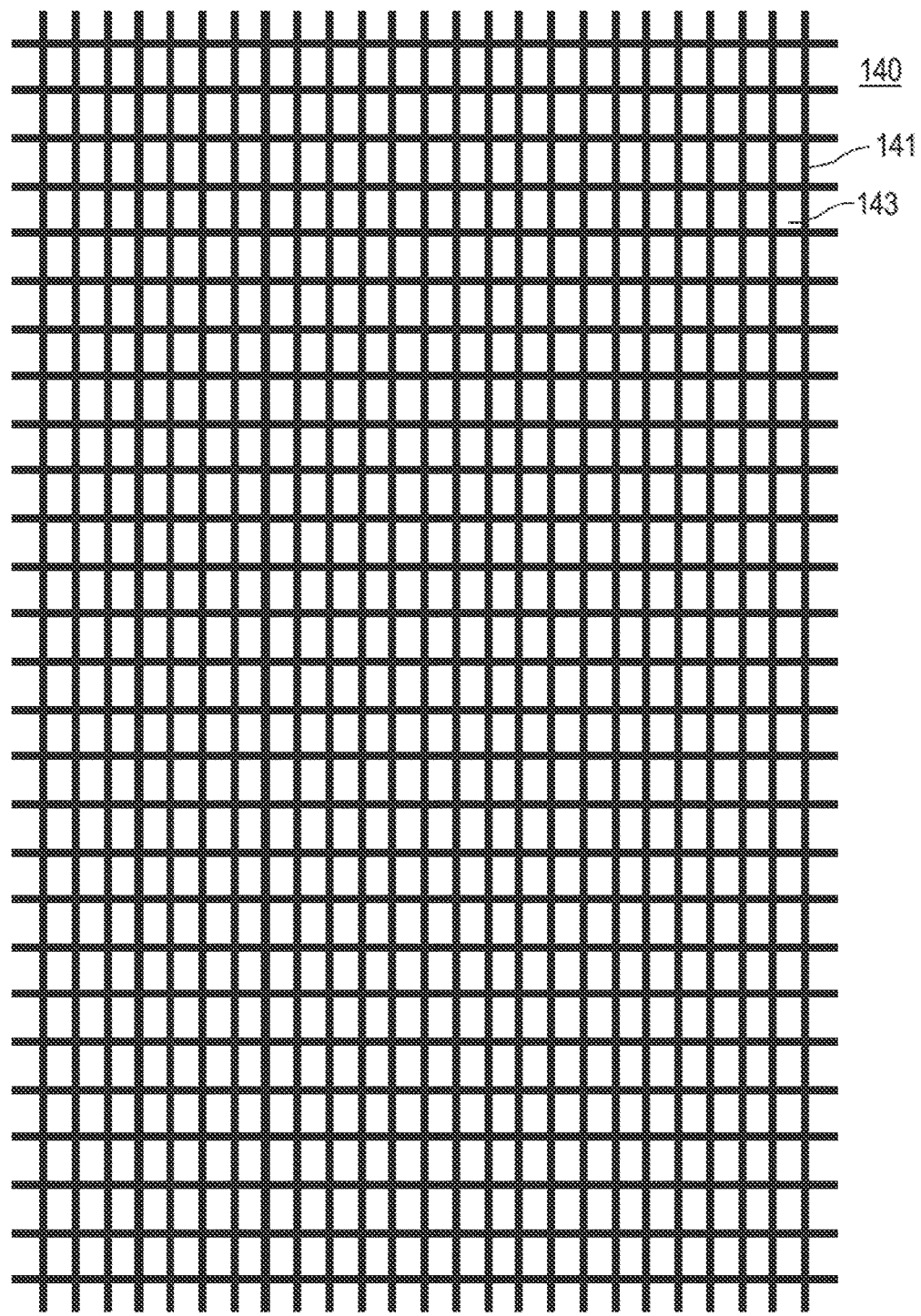
FIG. 2 is a schematic view of a black matrix layer.

FIG. 2 is a schematic diagram of the black matrix layer 140, which is the same as that of the prior LCD panel. As shown in FIG. 2, the black matrix layer 140 is composed of lines 141 of insulating material that are black and opaque. The lines 141 of black insulating material are arranged as a checkerboard pattern and the color filter is disposed among the spaces 143 defined by the lines 141 of black insulating material.

In prior LCD panel structure, a thin film transistor layer is disposed on a surface of the lower substrate facing the display material layer, and is composed of thin film transistors and transparent electrodes.

In the present invention, there are M dashed conductor lines arranged in the typical thin film transistor layer along a second direction, and N conductor lines arranged in the typical thin film transistor layer along a first direction, so as to provide sensing areas and sensing signal connection lines thereby forming the thin film transistor and sensing electrode layer 150 in accordance with the present invention. Therefore, there is no need to arrange an ITO sensing electrode layer on the upper glass substrate or the lower glass substrate of an LCD display panel, so as to reduce the manufacturing cost, simplify the manufacturing process and increase the yield rate.

Figure 3:
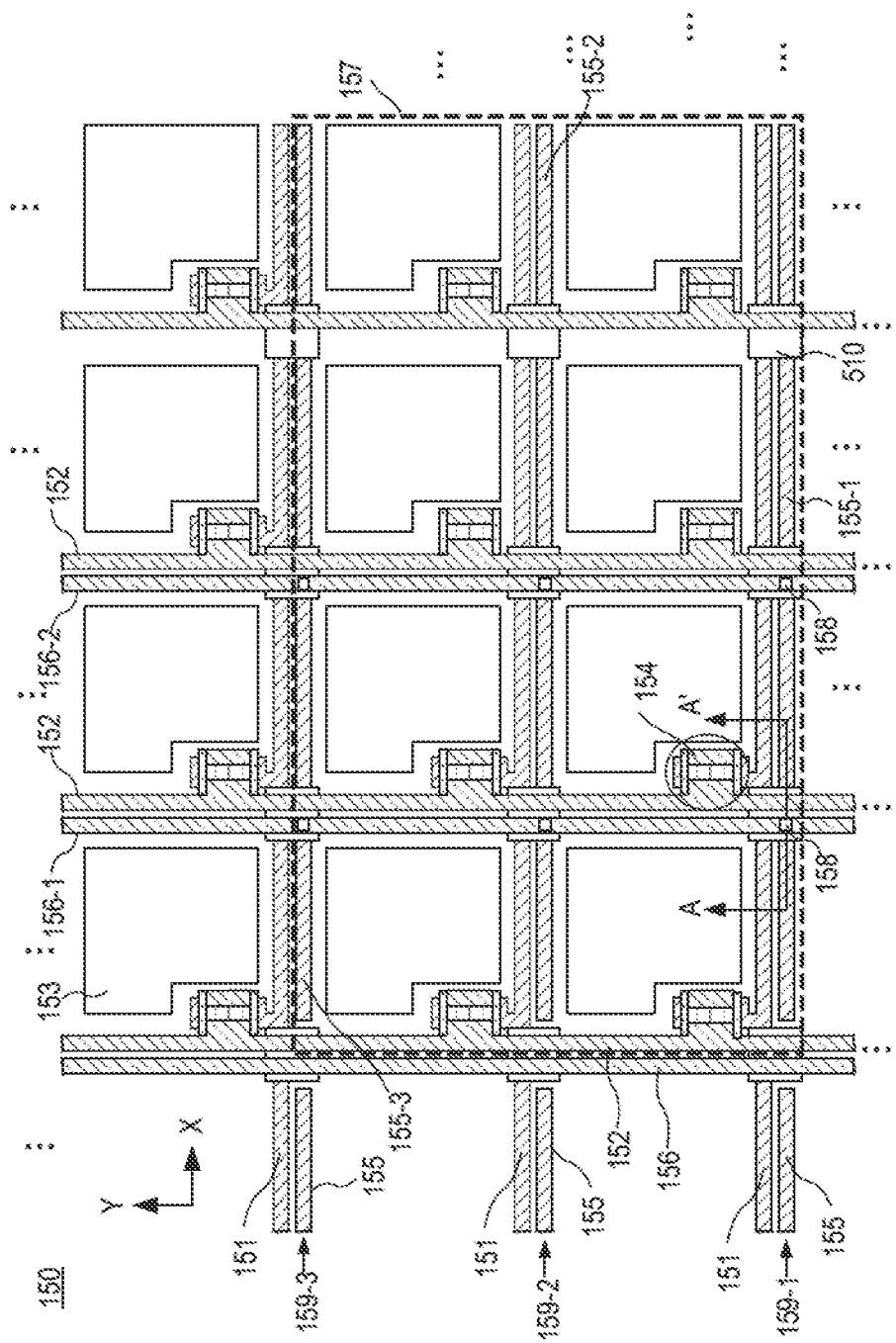
FIG. 3 schematically illustrates a portion of the thin film transistor and sensing electrode layer according to an embodiment of the present invention.

FIG. 3 schematically illustrates a portion of the thin film transistor and sensing electrode layer 150 according to an embodiment of the present invention, which is viewed from the upper substrate 110 to the lower substrate 120. The thin film transistor and sensing electrode layer 150 is disposed on the surface of the lower substrate 120 facing the display material layer 130, and includes K gate lines 151 and L source lines 152. The K gate lines 151 are arranged in a first direction (X-axis direction), and the L source lines 152 are arranged in a second direction (Y-axis direction), so as to form a plurality of pixel blocks 153, wherein the first direction is perpendicular to the second direction.

Each of the pixel blocks 153 has a pixel transistor 154 and a capacitor (not shown) corresponding thereto, so as to drive the corresponding pixel transistor 154 and capacitor according to a display pixel signal and a display driving signal thereby performing a display operation, wherein K, L are each a positive integer. In addition, based on different driving circuit, each of the pixel blocks 153 may have more than one transistor, while there is only one transistor shown in the figure for illustrative purpose.

The thin film transistor and sensing electrode layer 150 further includes N conductor lines 156 arranged along the second direction and M dashed conductor lines 159 arranged along the first direction, where M, N are each a positive integer. Each of the dashed conductor lines 159 is formed by continuing a plurality of conductor segments 155 extended in the first direction, wherein two continued conductor segments 155 of each dashed conductor line 159 are separated from each other by a conductor line 156 intersected with the dashed conductor line 159. It is noted that the separation location of each dashed conductor line is not limited to be the intersection with the dashed conductor line. Alternatively, the separation location is based on a location of forming a profile of a polygonal sensing area. Each of the conductor segments 155 is arranged in the first direction and is close to a gate line 151 in parallel. Each of the conductor lines 156 is arranged in the second direction and is close to a source line 152 in parallel. The thin film transistor and sensing electrode layer 150 makes use of a portion of the conductor segments 155 to form a plurality of sensing areas 157 and makes use of a portion of the N conductor lines 156 to form a plurality of sensing signal connection lines. The plurality of sensing signal connection lines are correspondingly connected to the plurality of sensing areas 157, respectively, so as to detect whether there is an external object approached according to a touch driving signal.

The sensing area 157 is substantially a polygonal area, which is preferred to be a quadrilateral area, as shown in FIG. 3, but this is not limiting. The polygonal area can be a triangle, square, rectangle, trapezoid, rhombus, pentagon, hexagon, octagon, round, star, wedge, radiation, or irregularity. In this embodiment, the sensing area 157 is composed of three conductor segments 155-1, 155-2 and 155-3. Two conductor lines 156-1 and 156-2 are connected to the three conductor segments 155-1, 155-2 and 155-3 through via 158 in order to serve as signal connection lines for extending the sensing signal of the sensing area 157 to one side of the lower substrate through corresponding metal connection lines, and further to a flexible circuit board (not shown).

As shown in FIG. 3, the plurality of conductor segments 155 are arranged at positions corresponding to those of the K gate lines 151 of the thin film transistor and sensing electrode layer 150, and the N conductor lines 156 are arranged at positions corresponding to those of the L source lines 152 of the thin film transistor and sensing electrode layer 150.

Figure 4:
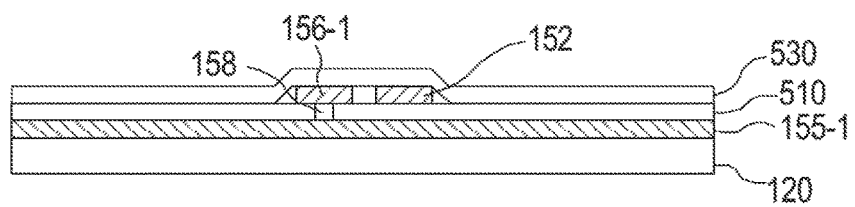
FIG. 4 is a cross-sectional view of the thin film transistor and sensing electrode layer of FIG. 3 taking along the A-A' line.

FIG. 4 is a cross-sectional view of the thin film transistor and sensing electrode layer of FIG. 3 taking along the A-A' line. As shown in FIG. 4, the conductor segment 155-1 is arranged on the lower substrate 120, and a first insulating area 510 is arranged on the conductor segment 155-1 in order to insulate the source line 152 from the conductor segment 155-1 while enabling the conductor line 156-1 to be electrically connected with the conductor segment 155-1 through the via 158. Since the first insulating area 510 is provided to insulate the source line 152 from the conductor segment 155-1, it is arranged only at the position where the source line 152 is intersected with the conductor segment 155-1.

Figure 5:
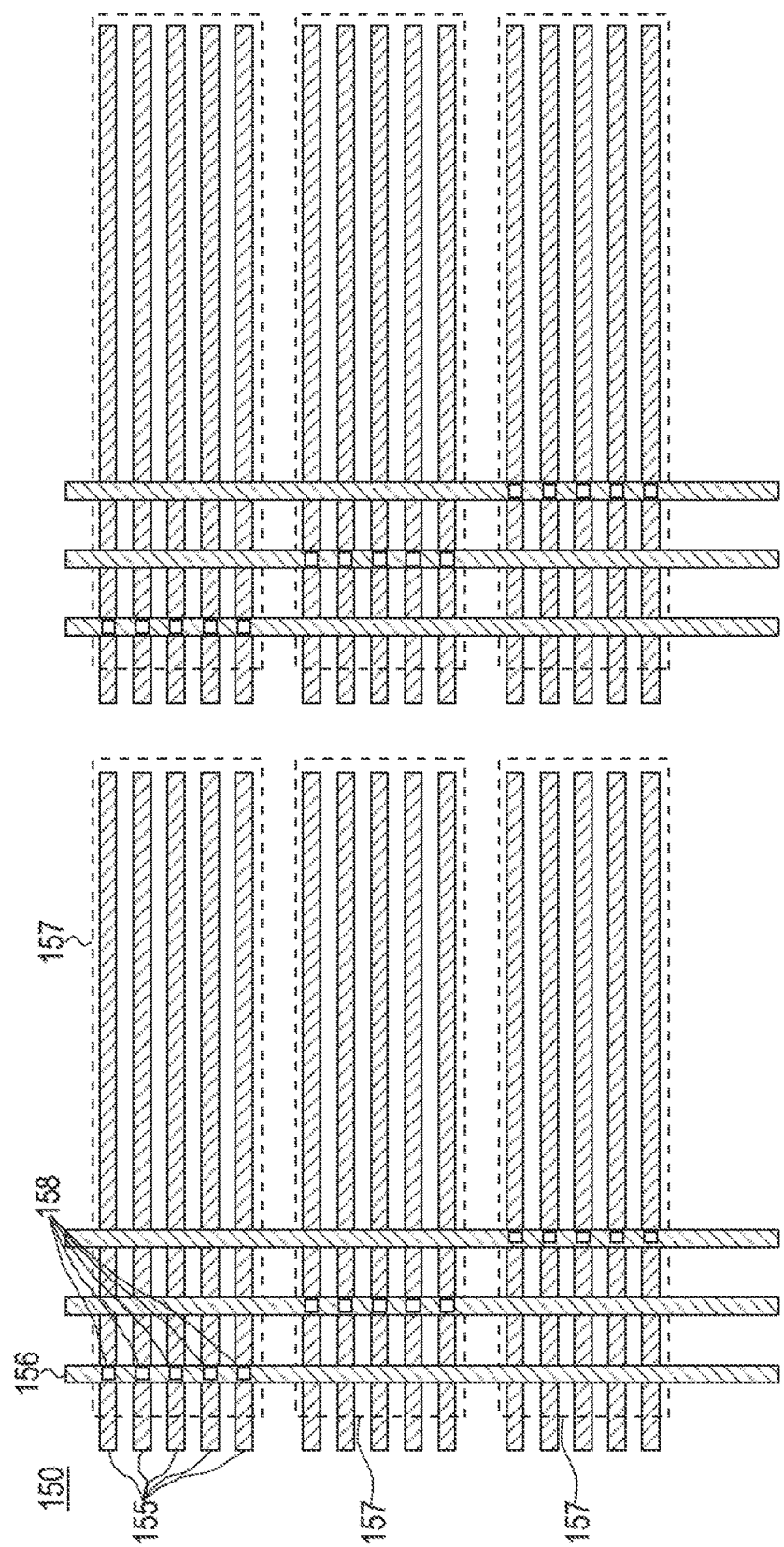
FIG. 5 is a schematic view of a plurality of sensing areas and signal connection lines according to an embodiment of the invention.

FIG. 5 schematically illustrates a plurality of sensing areas 157 and signal connection lines according to an embodiment of the present invention, which is viewed from the upper substrate 110 to the lower substrate 120. As shown in FIG. 5, the plurality of conductor segments 155 of the thin film transistor and sensing electrode layer 150 are arranged in the first direction (X-axis direction), and the N conductor lines 156 are arranged in the second direction (Y-axis direction) which is perpendicular to the first direction. The plurality of conductor segments 155 and the N conductor lines 156 of the thin film transistor and sensing electrode layer 150 are made of conductive metal or alloy material. The conductive metal or alloy material is selected from the group consisting of: molybdenum, barium, aluminum, silver, copper, titanium, nickel, tantalum, cobalt, tungsten, magnesium, calcium, potassium, lithium, and indium.

In FIG. 5, a sensing area 157 is composed of five conductor segments 155 and one conductor line 156 is used as the signal connection line. The conductor segments 155 of each sensing area 157 are electrically connected together, while any two the sensing areas 157 are not electrically connected with each other, so as to form a single-layer sensing touch pattern structure in the thin film transistor and sensing electrode layer 150. In other embodiments, each sensing area 157 may have more than one conductor line 156 serving as the signal connection lines. For example, as shown in the embodiment of FIG. 3, there are two conductor lines serving as the signal connection lines for a sensing area.

As shown in FIGS. 3 and 5, at least one conductor line 156 is used as a signal connection line, and each signal connection line is electrically connected to a corresponding sensing area 157, while the signal connection lines in different sensing areas are not connected with each other.

The color filter layer 160 is disposed at a surface of the black matrix 140 facing the display material layer 130. The upper polarizer 190 is disposed at a surface of the upper substrate 110 opposite to the display material layer 130. The lower polarizer 200 is disposed at a surface of the lower substrate 120 opposite to the display material layer 130. The common electrode layer 180 is disposed between the upper substrate 110 and the lower substrate 120. The over coat layer 170 is disposed between the common electrode layer 180 and the color filter layer 160. The display material layer 130 is preferably a liquid crystal LC layer.

Figure 6:
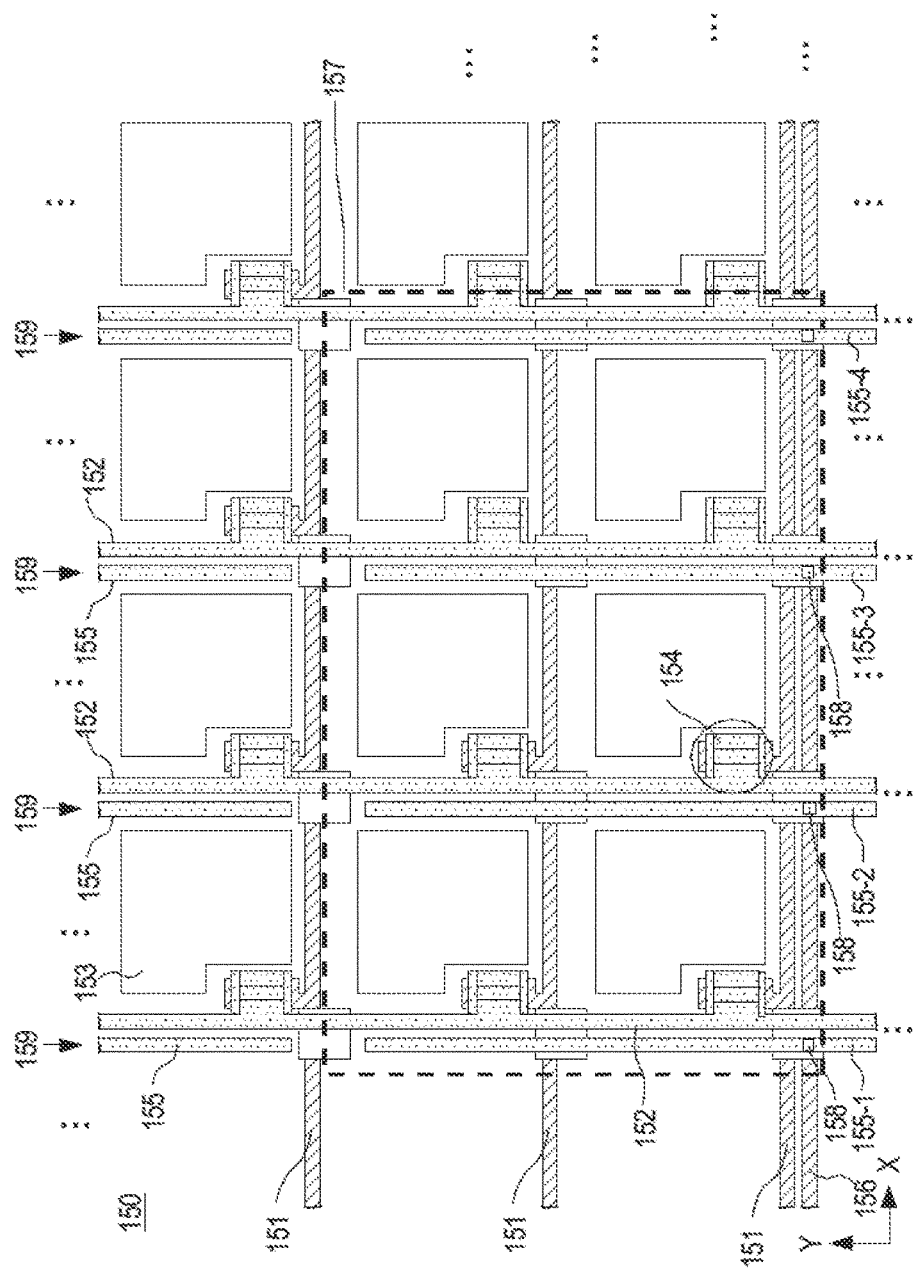
FIG. 6 schematically illustrates a portion of the thin film transistor and sensing electrode layer according to another embodiment of the present invention.

FIG. 6 schematically illustrates a portion of the thin film transistor and sensing electrode layer 150 according to another embodiment of the present invention. This embodiment is similar to that of FIG. 3, except that the thin film transistor and sensing electrode layer 150 includes M conductor lines 156 arranged along the first direction and N dashed conductor lines 159 arranged along the second direction, where M, N are each a positive integer. Each of the dashed conductor lines 159 is formed by continuing a plurality of conductor segments 155 extended in the second direction, wherein two continued conductor segments 155 of each dashed conductor line 159 are separated by a conductor line 156 intersected with the dashed conductor line 159. It is noted that the separation location of each dashed conductor line is not limited to be the intersection with the dashed conductor line. Alternatively, the separation location is based on a location of forming a profile of a polygonal sensing area. Each of the conductor lines 156 is arranged in the first direction and is close to a gate line 151 in parallel, and each of the conductor segments 155 is arranged in the second direction and is close to a source line 152 in parallel.

Namely, in this embodiment, the thin film transistor and sensing electrode layer 150 makes use of a portion of the M conductor segments 155 to form a plurality of sensing areas 157 and makes use of a portion of the M conductor lines 156 to form a plurality of sensing signal connection lines.

The sensing area 157 is substantially a polygonal area, which is preferred to be a quadrilateral area, as shown in FIG. 6, but this is not limiting. The polygonal area can be a triangle, square, rectangle, trapezoid, rhombus, pentagon, hexagon, octagon, round, star, wedge, radiation, or irregularity. In this embodiment, the sensing area 157 is composed of four conductor segments 155-1, 155-2, 155-3 and 155-4. One conductor line 156 is connected to the four conductor segments 155-1, 155-2, 155-3 and 155-4 through via 158 in order to serve as a signal connection line for extending the sensing signal of the sensing area 157 to one side of the lower substrate through a corresponding metal connection line, and further to a flexible circuit board (not shown).

The display material layer 130 is a liquid crystal layer or an organic light emitting diode (OLED) layer.

Figure 7:
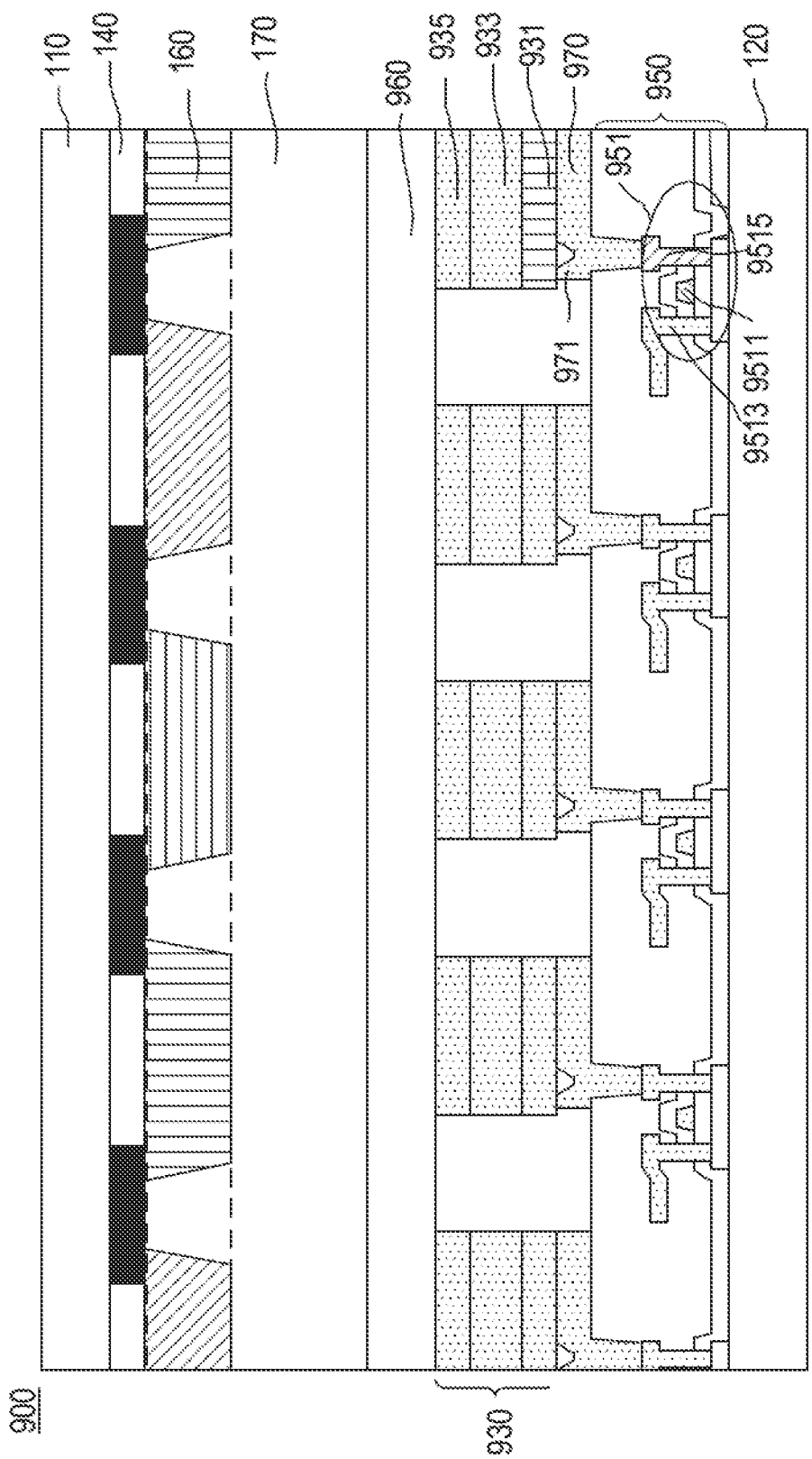
FIG. 7 schematically illustrates a stacked diagram of an in-cell touch display structure according to another embodiment of the present invention.

FIG. 7 schematically illustrates a stacked diagram of an in-cell touch display structure according to another embodiment of the present invention. This embodiment is similar to that of FIG. 1, except for the display material layer 930, the cathode layer 960, the anode layer 970, and the thin film transistor and sensing electrode layer 950.

The upper substrate 110 and the lower substrate 120 are preferably glass substrates or plastic substrates. The upper substrate 110 and the lower substrate 120 are arranged in parallel, and the display material layer 930 is disposed in between the two substrates 110, 120. In this embodiment, the display material layer 930 is preferably an organic light emitting diode (OLED) layer.

In the present invention, there are a plurality of dashed conductor lines arranged in the typical thin film transistor layer along a second direction, and a plurality of conductor lines arranged in the typical thin film transistor layer along a first direction, so as to provide sensing areas and sensing signal connection lines thereby forming the thin film transistor and sensing electrode layer 950 in accordance with the present invention. Therefore, there is no need to arrange an ITO sensing electrode layer on the upper glass substrate or the lower glass substrate of an LCD display panel, so as to reduce the manufacturing cost, simplify the manufacturing process and increase the yield rate.

The M dashed conductor lines and the N conductor lines, or the M conductor lines and N dashed conductor lines are similar to those of the previous embodiment, as described in details with reference to FIG. 3 to FIG. 6, and thus a detailed description therefor is deemed unnecessary.

The thin film transistor and sensing electrode layer 950 is disposed on a surface of the lower substrate facing the display material layer 930 and includes a plurality of gate lines (not shown), a plurality of source lines (not shown), a plurality of dashed conductor lines 159 arranged along the second direction, a plurality of conductor lines 156 arranged along the first direction, and a plurality of pixel driving circuits 951. Each of the pixel driving circuits 951 corresponds to one pixel, so that the corresponding pixel driving circuit can be driven according to a display pixel signal and a display driving signal thereby performing a display operation.

According to different designs of pixel driving circuit 951, such as 2T1C being formed with two thin film transistors and a storage capacitor and 6T2C being formed with six thin film transistors and two storage capacitors, a gate 9511 of at least one thin film transistor in the pixel driving circuit is connected to a gate line (not shown). According to different designs of driving circuit, a drain/source 9513 of at least one thin film transistor in a control circuit is connected to a source line (not shown) and a source/drain 9515 of at least one thin film transistor in the control circuit is connected to a corresponding anode pixel electrode 971 of the anode layer 970.

The cathode layer 960 is disposed on a surface of the upper substrate 110 facing the display material layer 930 and between the upper substrate 110 and the display material layer 930. The cathode layer 960 is formed with conductive metal material, preferably metal material with a thickness smaller than 50 nm. The metal material is selected from the group consisting of aluminum, silver, magnesium, calcium, potassium, lithium and indium, alloy thereof, and mixture of lithium fluoride, magnesium fluoride, lithium oxide and aluminum. Due to the thickness of the cathode layer 960 being smaller than 50 nm, the light generated by the display material layer 930 can pass through the cathode layer 960, so as to images on the upper substrate 110. The cathode layer 960 is electrically connected in the whole piece, so that it can be used as a shielding. In addition, the cathode layer 960 receives the current coming from the anode pixel electrode 971.

The anode layer 970 is disposed on a surface of the thin film transistor and sensing layer 950 facing the display material layer 930 and includes a plurality of anode pixel electrodes 971. Each of the anode pixel electrodes 971 corresponds to one pixel driving transistor of the pixel driving circuit 951 of the thin film transistor and sensing electrode layer 950. Namely, each of the anode pixel electrodes 971 is connected to the source/drain of the pixel driving transistor of the corresponding pixel driving circuit 951, so as to form a pixel electrode of a specific color, for example a red pixel electrode, a green pixel electrode, or a blue pixel electrode.

The display material layer 930 includes a hole transporting layer (HTL) 931, an emitting layer 933, and an electron transporting layer (ETL) 935. The display material layer 930 preferably generates a white light to be filtered by the color filter layer 160, so as to produce lights with the three primary colors, i.e., red light, blue light, and green light.

Figure 8:
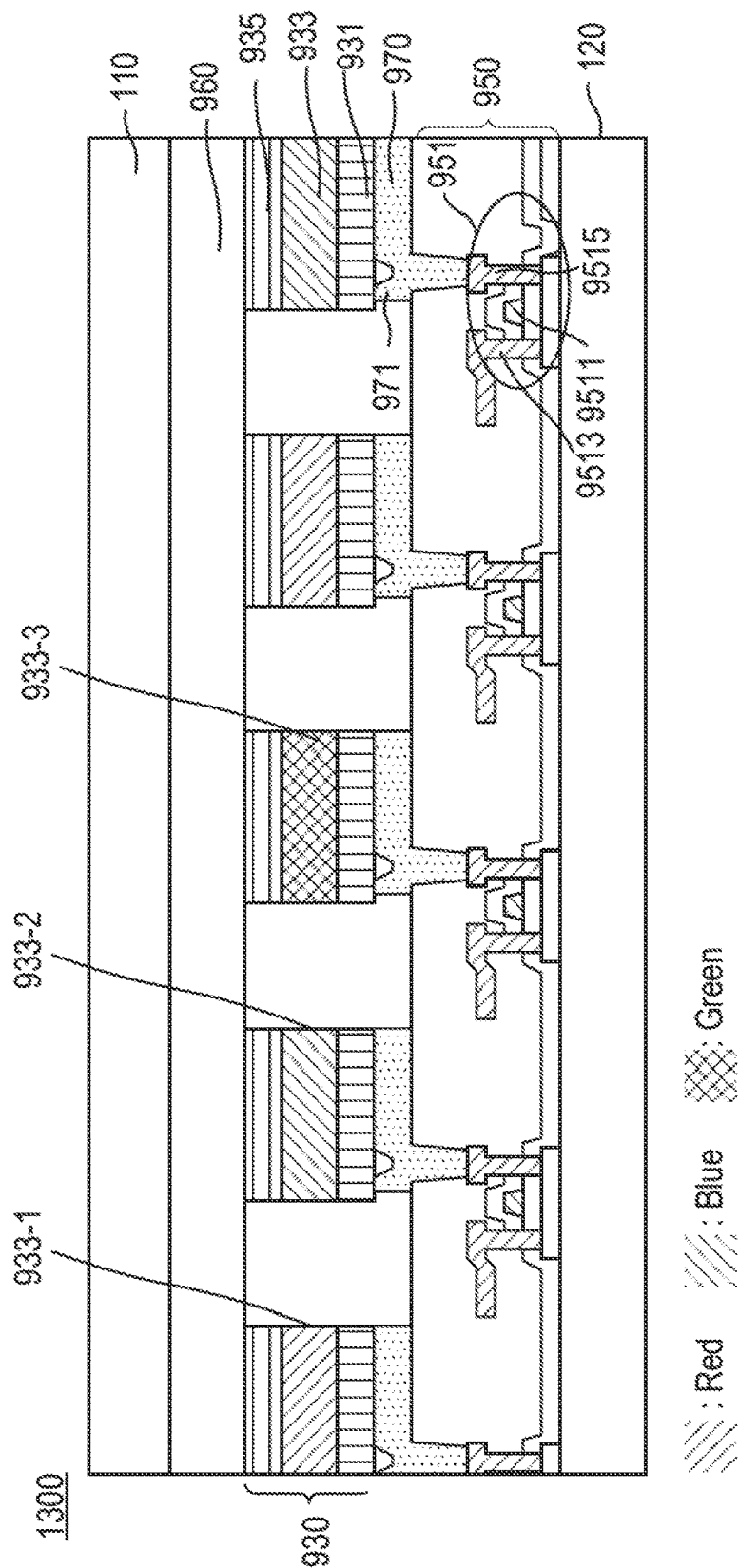
FIG. 8 schematically illustrates a stacked diagram of an in-cell touch display structure according to a further embodiment of the present invention.

FIG. 8 schematically illustrates a stacked diagram of an in-cell touch display structure 1300 according to a further embodiment of the present invention. As shown in FIG. 8, the in-cell touch display structure 1300 includes an upper substrate 110, a lower substrate 120, a display material layer 930, a thin film transistor and sensing electrode layer 950, a cathode layer 960, and an anode layer 970. This embodiment is similar to that of FIG. 7, except that, in FIG. 8, a red emitting layer 933-1, a blue emitting layer 933-2 and a green emitting layer 933-3 are provided, and thus there is no need to use the black matrix layer 140, the color filter layer 160 and the over coat layer 170.

As cited, it is known that, the invention arranges M dashed conductor lines 159 along the second direction and N conductor lines 156 along the first direction, or arranges M conductor lines 156 along the second direction and N dashed conductor lines 159 along the first direction on the thin film transistor and sensing electrode layer ISO, whereby there is no need to have an ITO sensor layer formed on the upper or lower glass substrate of the display panel, so as to lower the manufacturing cost and simplify the manufacturing process.

Furthermore, the conductor segments 155 of the invention can be defined on a mask on which the typical gate lines 151 are defined, and the conductor lines 156 can be defined on a mask on which the typical source lines 156 are defined. As a result, the LCD panel can be provided with the touch function without having to add any extra manufacturing step.

Although the present invention has been explained in relation to its preferred embodiment, it is to be understood that many other possible modifications and variations can be made without departing from the spirit and scope of the invention as hereinafter claimed.

What is claimed is:

1. An in-cell touch display structure, comprising:
an upper substrate;
a lower substrate parallel to the upper substrate;
a display material layer configured between the upper substrate and the lower substrate; and
a thin film transistor and sensing electrode layer disposed on a surface of the lower substrate facing the display material layer and having K gate lines arranged in a first direction and L source lines arranged in a second direction so as to form a plurality of pixel blocks, each pixel block having a pixel transistor and a capacitor corresponding thereto for being driven based on a display pixel signal and a display driving signal thereby performing a display operation, where K and L are each a positive integer, the thin film transistor and sensing electrode layer further having N conductor lines arranged along the second direction and M parallel segmented conductor lines arranged along the first direction, each segmented conductor line being formed by continuing a plurality of conductor segments, two continued conductor segments of each segmented conductor line being separated from each other, where M and N are each a positive integer, each conductor segment being arranged in the first direction and close to a gate line in parallel, each conductor line being arranged in the second direction and close to a source line in parallel,
wherein the thin film transistor and sensing electrode layer is divided into a plurality of sensing areas; each of the sensing areas is formed by including a portion of the conductor segments adjacent in parallel to each other along the first direction and respectively belonging to a portion of the segmented conductor lines adjacent each other for carrying an identical touch driving signal generated when an external object approaches to the sensing area; and at least one of the conductor lines is connected to the portion of the conductor segments through vias and used as a sensing signal connection line.

2. The in-cell touch display structure as claimed in claim 1, wherein each sensing signal connection line is connected to a corresponding sensing area through a via.

3. The in-cell touch display structure as claimed in claim 2, wherein the M segmented conductor lines are disposed at positions corresponding to those of the K gate lines of the thin film transistor and sensing electrode layer, and the N conductor lines are disposed at positions corresponding to those of the L source lines of the thin film transistor and sensing electrode layer.

4. The in-cell touch display structure as claimed in claim 2, wherein the sensing signal connection line is extended to one side of the lower substrate through a corresponding metal connection line, and further to a flexible circuit board.

5. The in-cell touch display structure as claimed in claim 4, wherein the sensing area is a polygonal area of a triangle, square, rectangle, trapezoid, rhombus, pentagon, hexagon, octagon, round, star, wedge, radiation, or irregularity.

6. The in-cell touch display structure as claimed in claim 5, wherein the first direction is perpendicular to the second direction.

7. The in-cell touch display structure as claimed in claim 6, wherein the display material layer is a liquid crystal layer or an organic light emitting diode layer.

8. An in-cell touch display structure, comprising:
an upper substrate;
a lower substrate parallel to the upper substrate;
a display material layer configured between the upper substrate and the lower substrate; and
a thin film transistor and sensing electrode layer disposed on a surface of the lower substrate facing the display material layer and having K gate lines arranged in a first direction and L source lines arranged in a second direction so as to form a plurality of pixel blocks, each pixel block having a pixel transistor and a capacitor corresponding thereto for being driven based on a display pixel signal and a display driving signal thereby performing a display operation, where K and L are each a positive integer, the thin film transistor and sensing electrode layer further having M conductor lines arranged along the first direction and N parallel segmented conductor lines arranged along the second direction, each segmented conductor line being formed by continuing a plurality of conductor segments, two continued conductor segments of each segmented conductor line being separated from each other, where M and N are each a positive integer, each conductor line being arranged in the first direction and close to a gate line in parallel, each conductor segment being arranged in the second direction and close to a source line in parallel, wherein the thin film transistor and sensing electrode layer is divided into a plurality of sensing areas; and each of the sensing areas is formed by including a portion of the conductor segments adjacent in parallel to each other along the second direction and respectively belonging to a portion of the segmented conductor lines adjacent each other for carrying an identical touch driving signal generated when an external object approaches to the sensing area; and at least one of the conductor lines is connected to the portion of the conductor segments through vias and used as a sensing signal connection line.

9. The in-cell touch display structure as claimed in claim 8, wherein each sensing signal connection line is connected to a corresponding sensing area through a via.

10. The in-cell touch display structure as claimed in claim 9, wherein the M conductor lines are disposed at positions corresponding to those of the K gate lines of the thin film transistor and sensing electrode layer, and the N segmented conductor lines are disposed at positions corresponding to those of the L source lines of the thin film transistor and sensing electrode layer.

11. The in-cell touch display structure as claimed in claim 9, wherein the sensing signal connection line is extended to one side of the lower substrate through a corresponding metal connection line, and further to a flexible circuit board.

12. The in-cell touch display structure as claimed in claim 11, wherein the sensing area is a polygonal area of a triangle, square, rectangle, trapezoid, rhombus, pentagon, hexagon, octagon, round, star, wedge, radiation, or irregularity.

13. The in-cell touch display structure as claimed in claim 12, wherein the first direction is perpendicular to the second direction.

* * * * *